May 24, 1955 — L. O. W. CORDREY — 2,708,925
COMBINATION CAMP COOKER, BAKER AND BARBECUE
Filed March 11, 1954 — 2 Sheets-Sheet 1
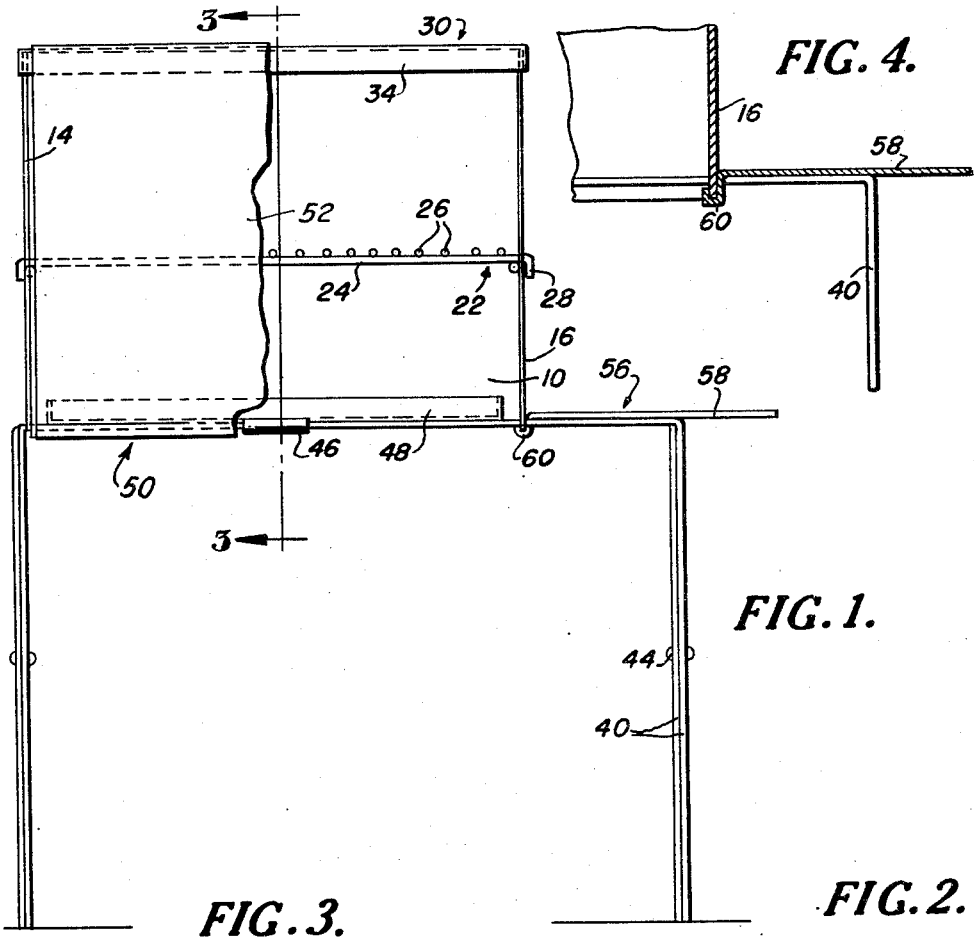
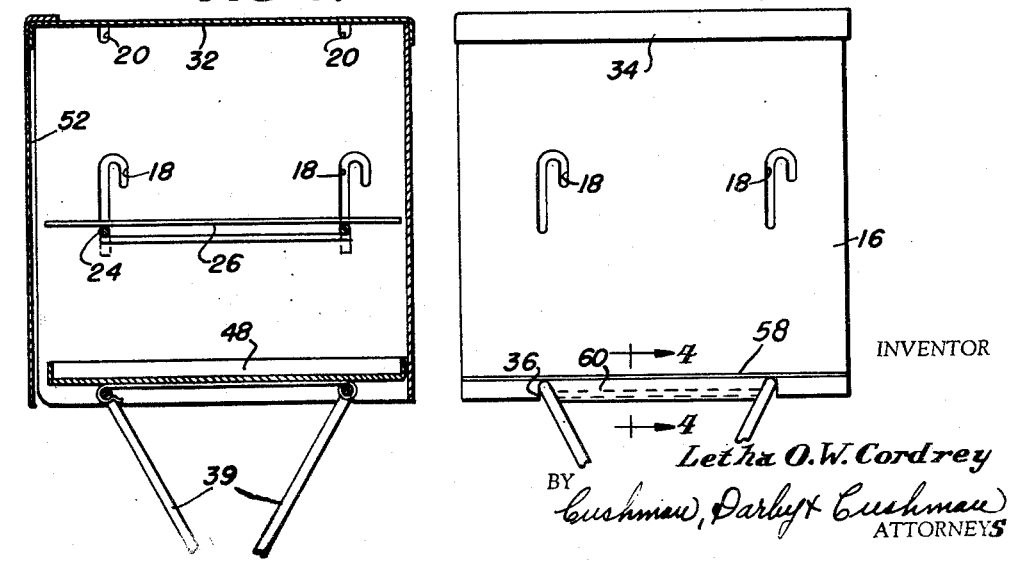
INVENTOR
Letha O. W. Cordrey
BY Cushman, Darby & Cushman
ATTORNEYS May 24, 1955  L. O. W. CORDREY  2,708,925
COMBINATION CAMP COOKER, BAKER AND BARBECUE
Filed March 11, 1954  2 Sheets-Sheet 2
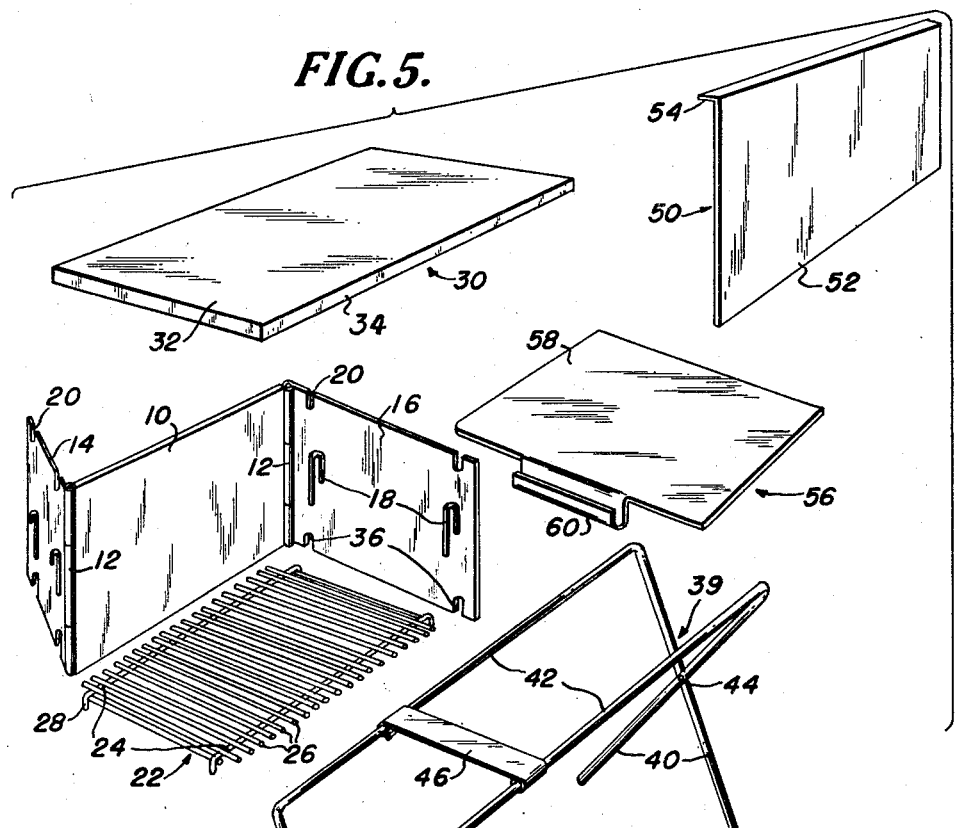
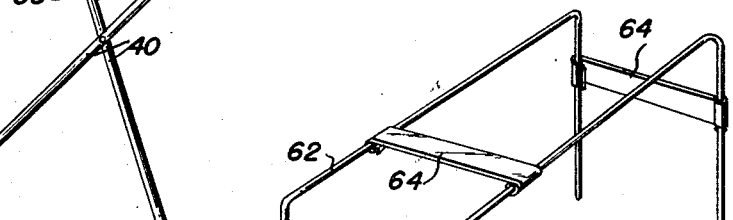
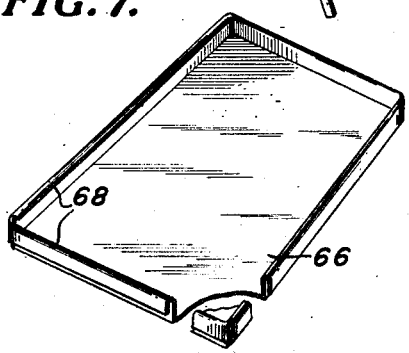
INVENTOR
Letha O. W. Cordrey
BY Cushman, Darby & Cushman
ATTORNEYS

United States Patent Office 2,708,925
Patented May 24, 1955

2,708,925

COMBINATION CAMP COOKER, BAKER AND BARBECUE

Letha O. W. Cordrey, San Diego, Calif.

Application March 11, 1954, Serial No. 415,523

10 Claims. (Cl. 126—25)

My invention relates to camp stoves and the like and more particularly to a collapsible combination camp cooker, baker and barbecue.

The primary object of my invention is the provision of a combination camp cooker, baker and barbecue which is composed of a minimum number of parts which are removably secured together to provide a sturdy construction which may be economically produced.

A further object of my invention is the provision of a collapsible camp stove which is adapted to function alternatively as a grill, a griddle or an oven.

A further object of my invention is the provision of the collapsible camp stove which is comprised of but a few removably connected parts which may be rigidly secured together so as to perform either a grilling, cooking or baking function.

A still further object of my invention is the provision of a combination camp cooker, baker and barbecue comprised of parts which may be easily disassembled and collapsed into a suitable carton so as to be conveniently carried thereby.

These and other objects of my invention will become more apparent during the course of the following description and appended claims.

The invention may best be understood with reference to the accompanying drawings wherein a preferred embodiment is shown.

In the drawings:

Figure 1 is a front elevational view with parts broken away showing the preferred form of my invention;

Figure 2 is a partial side elevational view;

Figure 3 is a cross sectional view taken along the line 3—3 of Figure 1;

Figure 4 is a cross sectional view taken along the line 4—4 of Figure 2;

Figure 5 is an exploded view showing the parts separated;

Figure 6 is a perspective view showing a modified form of the camp stove support; and Figure 7 is a perspective view showing a modified form of the camp stove griddle.

Referring now more particularly to the drawings there is shown a combination camp cooker, baker and barbecue embodying the principles of the present invention. The combination camp cooker, baker and barbecue or camp stove comprises a vertically extending rectangular plate 10 which constitutes the rear wall of the stove. Hinged along the opposite vertical edges of the plate or rear wall 10, as at 12, is a pair of rectangular plates 14 and 16 which constitute the side walls of the stove. As can be clearly seen from Figures 1 through 5, the side walls are of the same height as the rear wall and are adapted to extend transversely forward from the rear wall in their normal operating position. The side walls 14 and 16 are folded inwardly in their collapsed carrying position.

Each of the side plates 14 and 16 is provided in the mid portion thereof with a pair of spaced parallel inverted J-shaped openings 18 and extending downwardly from the upper edge of each of the side plates is a pair of spaced parallel slots 20. The purpose of the inverted J-shaped openings and the elongated slots is to support a grill 22 at different vertical positions thereon.

The grill 22 comprises a pair of longitudinally extending elongated parallel rods 24 and a plurality of transversely extending parallel rods 26 disposed above the parallel rods 24 and welded thereto to form a rigid construction. As can be seen in Figures 1 and 5, the opposite ends of the pair of rods 24 extend outwardly from the outermost transverse rods 26 and are bent downwardly to form down-turned projections 28. As shown in Figures 1 and 5 the outermost transverse rods may be welded below the parallel rods where they are bent downwardly.

As was stated above, the grill 22 is adapted to be supported by the side walls 14 and 16 at different vertical positions thereon and when so supported, the grill is adapted to rigidly secure the side walls in a fixed transverse operative position. In order to secure the grill 22 between the side walls, the projections 28 are inserted either through the openings 18 or the slots 20 in the side walls depending on the vertical position desired. The lower edges of the openings or slots support the bottom periphery of the ends of the rods 24 with the down-turned projections 28 abutting the outer surface of the side walls and the outermost transverse rods 26 abutting the inside surfaces of the side walls.

The construction thus far described may be utilized by itself as a grill with the walls 10, 14 and 16 supported on the ground as when used on sand beaches and the like with the fire being built directly on the sand so as to cook either over the open grill or with cooking utensils supported on the grill. As shown, the grill may be adjusted to three different vertical positions, one wherein the ends of the rods 24 are supported in the very bottom of the inverted J-shaped openings 18, a second wherein the ends of the rods 24 are supported in the bottom of the short leg of the inverted J-shaped openings 18 and a third wherein the ends of the rods 24 are supported in the bottom of the slots 20.

When it is desired to utilize my invention as a griddle or fryer, a top plate or griddle 30 may be removably mounted on the upper edges of the side walls 14 and 16 and rear wall 10. The griddle is preferably composed of a flat rectangular plate 32 having its outer edges bent downwardly at right angles to form a peripheral flange 34 which is adapted to abut the outer surfaces of the side walls and rear wall in operative position. The griddle 30 is usable with the side and rear walls either with the grill in position in the openings 18 or without the grill since the flange 34 by its engagement with the walls will hold the same in fixed operative position.

For many operations such as back yard cooking and the like, I have found that it is much more convenient and much cleaner to support the stove above the ground rather than directly on the ground where the fire is built. Consequently, side walls 14 and 16 are preferably provided with spaced parallel slots 36 which extend upwardly from the bottom edges thereof. The slots 36 are adapted to engage in a support generally designated at 38 which positions the stove above the ground.

The support 38 preferably comprises a pair of inverted U-shaped rods 39 having legs 40 and bight portions 42. The legs are pivoted respectively intermediate their ends as at 44 so that the bight portions 42 may move toward and away from each other from a collapsed position to an operative position. For the purpose of detachably securing the U-shaped rods in their operative position with the bight portions 42 in spaced relation, a plate 46 is swingably mounted upon one of the bight portions and hooked over the other bight portion. Thus, since downward pressure on the bight portions will tend to spread them apart due to the pivots 44, the plate 46 will hold them in operative spaced relation.

The bight portions 42 of the rods are adapted to seat in the upwardly extending slots 36 in the side walls 14 and 16 and when the plate 46 is connected between the bight portions, the inverted U-shaped rods 39 serve as a sturdy means to support the stove above the ground.

In order to bring the heat into suitable proximity to the stove when supported above the ground, a fire box or fuel grate 48 may be utilized which rests on top of the bight portions 42 and plate 46 between the side walls so as to dispose the same underneath the grill 22. When the support 38 is utilized, the grill 22 and griddle 30 may be utilized either separately or together in the manner previously described.

While I am aware that combination grill and griddle camp stoves are known in the art, the salient feature of the present construction is that it readily lends itself to be adapted for use as an oven. For the purpose of converting the camp stove into an oven, there is provided a front cover 50 which comprises a rectangular plate 52 having its upper edge bent at right angles with respect thereto to form a supporting flange 54. The supporting flange 54 is adapted to engage the top surface of the griddle 30 along its forward edge so as to removably suspend the plate 52 between the forward edges of the side walls 14 and 16.

When the present camp stove is utilized to perform its baking function, the grill is positioned in the openings 18, the griddle is positioned on the upper edges of the walls and with the front cover suspended from the griddle, there is provided an enclosed oven above the fuel grate 48 encompassing the area between the grill 22, the walls 10, 14 and 16, griddle 30 and front cover 50.

It is to be understood that the front cover may be provided with a suitable handle, if desired, in order to provide a convenient means for removing the same after the baking is completed. It is also to be noted that after the baking is completed, the baked articles may be placed on the removed front cover.

In order to provide a convenient place to rest cooking utensils and the like during use, a shelf 56 may be provided which comprises a rectangular plate 58 having a U-shaped flange 60 extending downwardly from one side thereof. When the walls 10, 14 and 16 are mounted on the support, the plate 58 is adapted to rest on top of the bight portions 42 of the rods 39 and extend outwardly therefrom with the U-shaped flange 60 engaged under the bottom edge of the adjacent side wall 16.

Shown in Figure 6 is a modified embodiment of the support 38 illustrated in Figures 1 through 5. The support of Figure 6 includes a pair of inverted U-shaped rods 62 similar to rods 39. However, in this embodiment the rods 62 are secured in parallel relation by a plurality of plates 64 swingably mounted on one of the U-shaped rods and detachably connected to the other U-shaped rod. The rods 62 are collapsed by disengaging the plates 64.

In Figure 7 there is shown a modified form of the griddle 30. The modified griddle includes a rectangular plate 66 having its ends bent into a U-shaped cross sectional configuration so as to provide an attaching flange 68 and to dispose the top surface of the plate 66 below the upper edge of the flange. The top edges of the walls 10, 14 and 16 seat in the attaching flange 68 to provide rigid support to hold the side walls in fixed operative position. It is also to be understood that the flange 54 of the front cover 50 may be modified to conform to the shape of the flange 68 so as to provide a secure means by which the front cover may be suspended in operative position.

It can thus be seen that I have provided a versatile camp stove which may be utilized either as a cooker, baker or barbecue for support above the ground or directly on the ground. The component parts of the stove are removably attached to form a sturdy rigid construction, but may be detached and collapsed to fit into a suitable carrying carton, not shown. The various elements are all constructed of either sheet metal or metal rods and formed in such a way as to be easily and economically manufactured. For example, the walls, griddle, front cover and shelf may be made of sheet aluminum and the fuel grate, support and grill may be cold rolled steel either oxidized in black or enamelled in black.

It is to be understood, however, that the form of the invention herewith shown and described is to be taken as the preferred embodiment of the same and that various changes may be made without departing from the spirit of the invention or the scope of the appended claims.

I claim:

1. In a collapsible camp stove, a vertically extending rear wall, side walls hinged to opposite vertical edges of said rear wall and a horizontally disposed grill adjustably carried by said side walls, said grill including a pair of parallel elongated rods having downturned opposite ends and a transverse rod spaced inwardly from each pair of down-turned ends, each of said side walls including a plurality of vertically spaced pairs of parallel openings for supporting said grill in selected vertical positions with the down-turned ends abutting in the outer surface of said side walls and the transverse rods abutting the inside surface of said side walls whereby said grill rigidly holds said side walls in fixed transverse relation with respect to said rear wall.

2. In a collapsible camp stove, a vertically extending rear wall, side walls hinged to opposite vertical edges of said rear wall and a horizontally disposed grill adjustably carried by said side walls, said grill having its ends substantially aligned with the vertical edges of said rear wall and including a pair of spaced downturned projections extending outwardly from each end thereof, each of said side walls including a plurality of vertically spaced pairs of parallel openings for supporting said grill in selected vertical positions with said down-turned ends abutting the outer surface of said side walls and the ends of the grill abutting the inside surface of said side walls whereby said grill rigidly holds said side walls in fixed transverse relation with respect to said rear wall.

3. In a collapsible camp stove as defined in claim 2, a griddle removably mounted on the top edges of said walls.

4. In a collapsible camp stove as defined in claim 3, a front cover removably suspended from said griddle to provide an oven within said grill, walls and griddle.

5. In a collapsible camp stove as defined in claim 2, a support including a pair of horizontally spaced rods, each of said side walls including a pair of parallel slots extending upwardly from the bottom edge thereof, said slots being adapted to receive said rods when said side walls are held transverse to said rear wall so as to removably mount said walls on said support.

6. In a collapsible camp stove as defined in claim 5, a fuel grate adapted to be supported on said rods below said grill.

7. In a collapsible camp stove as defined in claim 6, a top wall and griddle member removably mounted on the top edges of said walls and forming a top closure.

8. In a collapsible camp stove as defined in claim 7, a front cover removably suspended from said top wall and griddle member to provide an oven within said grill, walls, and member.

9. A combination cooker, baker and barbecue comprising a support including a pair of horizontally spaced rods, a vertically extending rear wall, side walls hinged to opposite vertical edges of said rear wall, each of said side walls having horizontally spaced slots extending upwardly from the lower edge thereof, said slots being adapted to receive said rods when said side walls are disposed transversely of said rear wall so as to removably mount said walls on said support, a fuel grate adapted to be supported on said rods between said side walls, a grill disposed between said side walls above said grate, means on said side walls for removably mounting said grill at different vertical positions thereon, a top wall and griddle member removably mounted on the top edges of said walls and forming a top closure, and a front cover removably suspended from said member, said walls, member and front cover when assembled constituting an enclosed oven for baking material supported on said grill, and said grill, member and rods cooperating to rigidify said hinged side walls.

10. A combination cooker, baker and barbecue as defined in claim 9 including a shelf adapted to be supported on said rods and to extend outwardly from one end thereof, the inner end of said shelf having a downturned flange adapted to engage the lower edge of one of said side walls.

References Cited in the file of this patent

UNITED STATES PATENTS

| | | |
|---|---|---|
| 1,404,808 | Taylor | Jan. 31, 1922 |
| 1,438,345 | Tait et al. | Dec. 12, 1922 |
| 1,448,148 | O'Kane | Mar. 13, 1923 |
| 2,307,914 | Bitney | Jan. 12, 1943 |
| 2,608,190 | Winning et al. | Aug. 26, 1952 |
| 2,625,148 | Synder | Jan. 13, 1953 |

FOREIGN PATENTS

| | | |
|---|---|---|
| 107,037 | Great Britain | June 21, 1917 |